(12) United States Patent
Hodjat et al.

(10) Patent No.: US 11,168,767 B2
(45) Date of Patent: Nov. 9, 2021

(54) TENSIONER

(71) Applicant: GATES CORPORATION, Denver, CO (US)

(72) Inventors: Yahya Hodjat, Oxford, MI (US); Lynda A. Elsas, Troy, MI (US); Richard L. Billings, Clarkston, MI (US)

(73) Assignee: Gates Corporation, Denver, CO (US)

( * ) Notice: Subject to any disclaimer, the term of this patent is extended or adjusted under 35 U.S.C. 154(b) by 343 days.

(21) Appl. No.: 16/168,539

(22) Filed: Oct. 23, 2018

(65) Prior Publication Data
US 2020/0124143 A1 Apr. 23, 2020

(51) Int. Cl.
*F16H 7/12* (2006.01)
*F16H 7/02* (2006.01)
*F16H 7/08* (2006.01)

(52) U.S. Cl.
CPC ............. *F16H 7/1218* (2013.01); *F16H 7/02* (2013.01); *F16H 2007/081* (2013.01); *F16H 2007/0893* (2013.01)

(58) Field of Classification Search
CPC ............. F16H 2007/081; F16H 7/1281; F16H 2007/084
USPC .......................................................... 474/135
See application file for complete search history.

(56) References Cited

U.S. PATENT DOCUMENTS

| | | | |
|---|---|---|---|
| 4,285,676 A * | 8/1981 | Kraft | F16H 7/1281 267/155 |
| 4,309,174 A * | 1/1982 | Sproul | F16H 7/1281 474/117 |
| 4,454,236 A * | 6/1984 | Foster | F16H 7/0848 474/101 |
| 4,472,162 A | 9/1984 | Hitchcock | |
| 4,473,362 A | 9/1984 | Thomey et al. | |
| 4,536,172 A * | 8/1985 | Burris | F16H 7/1236 474/135 |
| 4,551,120 A | 11/1985 | Thomey | |
| 4,557,707 A * | 12/1985 | Thomey | F16H 7/1218 474/101 |
| 4,563,167 A * | 1/1986 | Foster | F16H 7/1236 474/115 |
| 4,571,222 A * | 2/1986 | Brandenstein | F16H 7/1281 474/112 |

(Continued)

FOREIGN PATENT DOCUMENTS

WO 2008028782 A1 3/2008

OTHER PUBLICATIONS

European Patent Office, International Search Report and Written Opinion of the International Searching Authority, International application No. PCT/US2019/055602, dated Jan. 17, 2020.

*Primary Examiner* — Henry Y Liu

(74) *Attorney, Agent, or Firm* — Alyssa K. Sandrowitz, Esq

(57) ABSTRACT

A tensioner comprising a base, a pivot arm pivotally mounted to the base, a spring disposed between the pivot arm and the base, an arcuate damping member engaged on one end of the spring, the arcuate damping member frictionally engaged with the base, a pulley journalled to the pivot arm on a shaft, the pivot arm comprising stamped metal and a rolled edge and one or more reinforcing ribs, and the spring and the shaft being laser welded to the pivot arm.

6 Claims, 5 Drawing Sheets

(56) References Cited

U.S. PATENT DOCUMENTS

| | | | | |
|---|---|---|---|---|
| 4,618,335 | A * | 10/1986 | Brandenstein | F16H 7/1281 474/112 |
| 4,689,037 | A * | 8/1987 | Bytzek | F16H 7/1218 474/135 |
| 4,713,043 | A | 12/1987 | Biedermann | |
| 4,723,934 | A * | 2/1988 | Thomey | F16H 7/1218 474/135 |
| 4,822,322 | A * | 4/1989 | Martin | F16H 7/129 474/135 |
| 4,834,694 | A * | 5/1989 | Martin | F16H 7/129 474/135 |
| 4,981,116 | A * | 1/1991 | Trinquard | F02B 67/06 123/90.31 |
| 5,234,384 | A * | 8/1993 | Shibata | F16H 7/1218 474/135 |
| 5,288,276 | A * | 2/1994 | Golovatgai-Schmidt | F01L 1/02 474/133 |
| 5,421,788 | A * | 6/1995 | Toth | F16C 13/006 474/135 |
| 5,462,494 | A * | 10/1995 | Rogalla | F16H 7/1218 474/135 |
| 5,919,107 | A * | 7/1999 | Stepniak | F16H 7/1281 474/112 |
| 8,075,433 | B2 | 12/2011 | Quintus et al. | |
| 9,005,061 | B2 * | 4/2015 | Liebel | F16H 7/1218 474/135 |
| 2005/0043130 | A1 * | 2/2005 | Hao | F16H 7/1218 474/135 |
| 2005/0124447 | A1 * | 6/2005 | Message | F16H 7/1281 474/135 |
| 2005/0236867 | A1 * | 10/2005 | McNulty | B62D 33/023 296/183.1 |
| 2008/0287233 | A1 * | 11/2008 | Cantatore | F16H 7/1218 474/112 |
| 2009/0131208 | A1 * | 5/2009 | Hawryluck | F16H 7/1218 474/135 |
| 2010/0081529 | A1 * | 4/2010 | Liebel | F16H 7/1218 474/133 |
| 2010/0084834 | A1 * | 4/2010 | Ersoy | B60G 7/001 280/124.1 |
| 2010/0137083 | A1 * | 6/2010 | Carlson | F16H 7/1218 474/110 |
| 2010/0137084 | A1 * | 6/2010 | Mevissen | F16H 7/1218 474/135 |
| 2011/0156328 | A1 * | 6/2011 | Nicolio | F16F 1/10 267/156 |
| 2011/0207568 | A1 * | 8/2011 | Smith | F16H 7/1281 474/135 |
| 2011/0312454 | A1 * | 12/2011 | Comsa | F16H 7/1281 474/110 |
| 2013/0241108 | A1 * | 9/2013 | Zynda | B29C 45/14786 264/279 |
| 2014/0309882 | A1 * | 10/2014 | Antchak | F16H 7/12 701/36 |
| 2014/0356583 | A1 * | 12/2014 | Sanders | B32B 3/12 428/172 |
| 2015/0099137 | A1 * | 4/2015 | Yang | G06F 1/186 428/596 |
| 2015/0285344 | A1 * | 10/2015 | Buchen | F16H 7/12 474/135 |
| 2015/0298368 | A1 * | 10/2015 | Krahnert | B29C 43/222 264/154 |
| 2016/0377152 | A1 * | 12/2016 | Albrecht | F16H 7/1281 474/112 |
| 2017/0082176 | A1 * | 3/2017 | Buchen | F16H 7/1281 |
| 2017/0159295 | A1 * | 6/2017 | Warner | B32B 25/16 |
| 2019/0040937 | A1 * | 2/2019 | Ruiten | C08K 7/14 |

* cited by examiner

TENSIONER

FIELD OF THE INVENTION

The invention relates to a tensioner, and more particularly, to a tensioner having a pivot arm comprising stamped metal, a rolled edge, one or more reinforcing ribs, and protrusions for locating a spring and shaft thereon, and the spring and shaft laser welded to the pivot arm.

BACKGROUND OF THE INVENTION

Belt tensioners have been used for a very long time in the belt-pulley power transmission industry. In automotive industry belt tensioners become popular with the serpentine drive belts in late 1970's to adjust and optimize the belt tension for required best performance.

From the beginning until today mechanical tensioners have had a torsional spring housed in an aluminum cup with an aluminum arm transmitting the spring load to an idler pulley and to the belt. Repeated attempts by tensioner manufacturers to use alternative materials such as stamped sheet metal, powder metal (sinter metal), different types of plastics, and die cast magnesium has failed due to the cost, weight, strength, or performance.

In the automobile industry various vehicle accessories, such as the power steering pump, oil and air pumps, air conditioning and alternator, are operated by a single endless belt driven by a pulley connected to the engine crankshaft. This system is referred to as a "serpentine" drive belt system. To ensure optimum operating efficiency for these various accessories, it is necessary that the drive belt be maintained at a predetermined tension to assure efficient performance of the accessories as well as satisfactory service life for the belt. Due to the tendency for the belt to stretch over time, it is desirable that a belt tensioning device be used to provide reliable service and to maintain a constant amount of tension thereon regardless of the amount of belt stretch.

Tensioning devices use coil springs which are either in torsion, compression or tension, for applying and maintaining the tensioning force on a belt-engaging idler pulley.

It is also desirable that a belt tensioner be provided with some type of damping means to prevent excessive oscillation from occurring in the spring tensioning member, and which will absorb sudden shocks to prevent a whipping action from occurring in the tensioner and drive belt.

It is also desirable that a construction be provided so the product can be produced as inexpensively as possible without sacrificing durability and efficiency.

Casting of components is known as a means to manufacture tensioners. However, casting can on occasion cause product defects due to failures in process or material. As an alternative to casting tensioners can be made using stamped sheet steel which eliminates casting problems.

Representative of the art is U.S. Pat. No. 4,557,707 which discloses a belt tensioning device for an endless drive belt for a vehicle accessories drive system. A bracket is adapted to be mounted on an engine in a stationary position adjacent the drive belt and has lever means pivotally mounted thereon. An idler pulley is rotatably mounted on the lever means and is movable into belt tensioning engagement by a torsional coil spring telescopically mounted about the pivot for the lever means. The pulley is mounted so that a radial center line through the peripheral belt receiving surface of the pulley also passes generally through the center of the lever means pivot to reduce the frictional force exerted on the pivot. A brake band ring is mounted between the bracket and lever means and is biased by the torsional spring into a camming engagement with the lever means to provide a damping force when the lever means attempts to move in either a belt tensioning or non-tensioning direction. The damping force is proportional to the belt tensioning force throughout the tensioning range of the belt tensioner since the same coil spring provides both forces. The brake band has angled surfaces which move along complementary angled surfaces formed on the mounting bracket to provide an adjustable camming engagement therebetween.

What is needed is a tensioner having a pivot arm comprising stamped metal, a rolled edge, one or more reinforcing ribs, and protrusions for locating a spring and shaft thereon, and the spring and shaft laser welded to the pivot arm.

SUMMARY OF THE INVENTION

The primary aspect of the invention is to provide a tensioner having a pivot arm comprising stamped metal, a rolled edge, one or more reinforcing ribs, and protrusions for locating a spring and shaft thereon, and the spring and shaft laser welded to the pivot arm.

Other aspects of the invention will be pointed out or made obvious by the following description of the invention and the accompanying drawings.

The invention is a tensioner comprising a base, a pivot arm pivotally mounted to the base, a spring disposed between the pivot arm and the base, an arcuate damping member engaged on one end of the spring, the arcuate damping member frictionally engaged with the base, a pulley journalled to the pivot arm on a shaft, the pivot arm comprising stamped metal and a rolled edge and one or more reinforcing ribs, and the spring and the shaft being laser welded to the pivot arm.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

The accompanying drawings, which are incorporated in and form a part of the specification, illustrate preferred embodiments of the present invention, and together with a description, serve to explain the principles of the invention.

DETAILED DESCRIPTION OF THE PREFERRED EMBODIMENT

Figure 1:
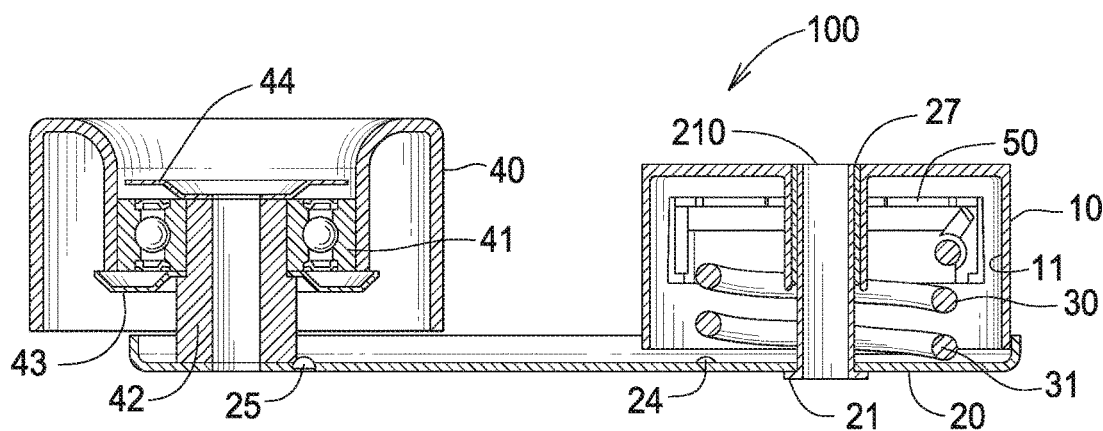
FIG. 1 is a cross-section of the tensioner.

FIG. 1 is a cross-section of the tensioner. The inventive tensioner 100 comprises sheet metal for construct components and utilizes laser welding to bond certain components to reduce weight and cost while delivering good performance.

Tensioner 100 comprises a base 10, pivot arm 20, spring 30 and pulley 40. Pivot arm 20 is pivotally attached to base 10 by shaft 21. Low friction bushing 27 is disposed between shaft 21 and base 10. Shaft 42 is preferably laser welded to pivot arm 20. Pulley 40 is mounted to shaft 42 on bearing 41. Dust covers 43, 44 prevent debris from entering bearing 41. Spring 30 is a torsion spring. Spring 30 urges pulley 40 toward a belt (not shown) to impart a load on the belt. The belt may be part of an engine accessory drive system (not shown) known in the art.

An end 31 of spring 30 is connected to pivot arm 20. The other end 32 of spring 30 is connected to a damping member 50. Damping member 50 frictionally engages an inner surface 11 of base 10. Damping member 50 damps oscillatory movements of pivot arm 20 during operation of the tensioner.

Pivot arm 20 for the tensioner is made from sheet steel plate using known stamping processes. To reduce the weight of the pivot arm, embossments or ribs are used to strengthen the pivot arm and to minimize the thickness of the sheet metal. The inventive stamped pivot arm replaces prior art cast pivot arms that are widely used in the tensioner arts.

Figure 2:
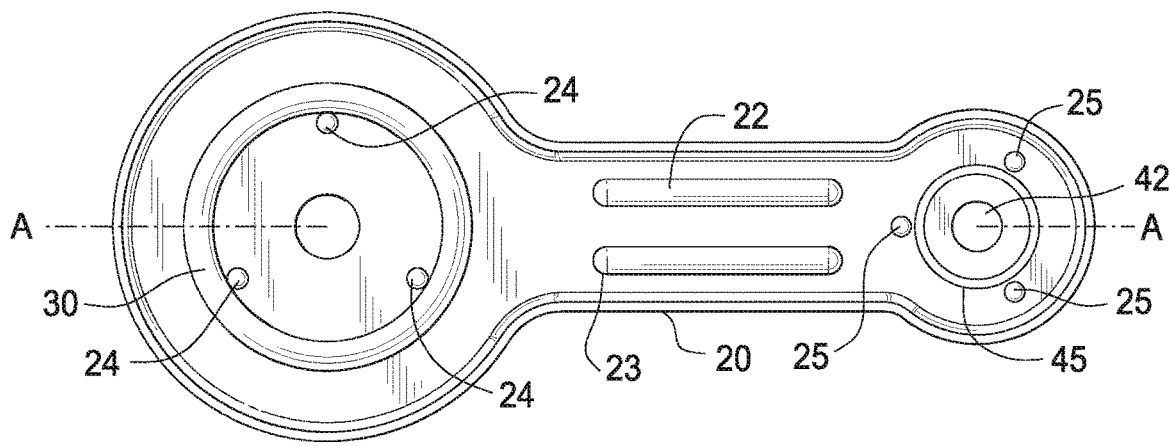
FIG. 2 is a plan view of the pivot arm.

FIG. 2 is a plan view of the pivot arm. Ribs 22, 23, are stamped into pivot arm 20. Ribs 22, 23, may extend in a longitudinal direction of the pivot arm 20, roughly aligned on an axis A-A between pulley 40 and base 10. The depth or relief of each reinforcing rib is determined by the design requirements of the user. The number of ribs is also dependent on the operational requirements. The number of ribs may comprise one or more depending upon the design requirements.

Dimples or protrusions 24 are stamped into pivot arm 20. Spring 30 is located on the pivot arm by dimples 24. Three dimples are shown in FIG. 2, but the number of dimples may vary depending on the operational requirements. Dimples 24 facilitate properly locating spring 30 on pivot arm 20 during the assembly process.

Dimples or protrusions 25 are used to locate the position of shaft 42 on pivot arm 20. Dimples 25 are stamped into pivot arm 20. Three dimples are shown in FIG. 2, but the number of dimples may vary depending on the operational requirements. Dimples 25 facilitate properly locating shaft 42 on pivot arm 20 during the assembly process.

Figure 3:
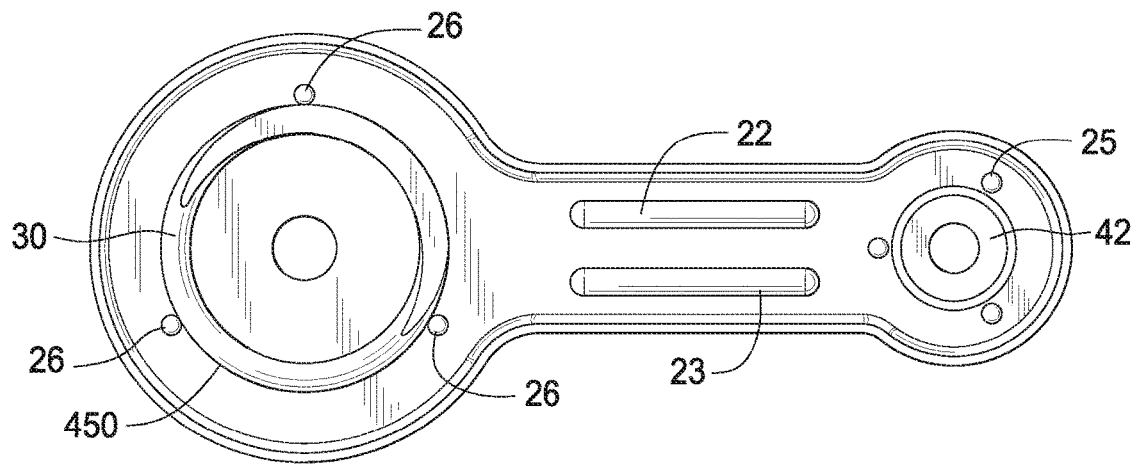
FIG. 3 is a plan view of the pivot arm.

FIG. 3 is a plan view of the pivot arm. Embossment or coining both may be used to create the dimples 24, 25, ribs 22, 23 and other aspects of this tensioner.

Embossment is forming of sheet metal where the opposite side shows an opposite forming effect, for example, such as license plate numbers. Coining refers to sheet metal that is formed on one side without having any visible effects on the other side, for example, like currency coins. Both practices can be used for manufacture of this tensioner.

Figure 4:
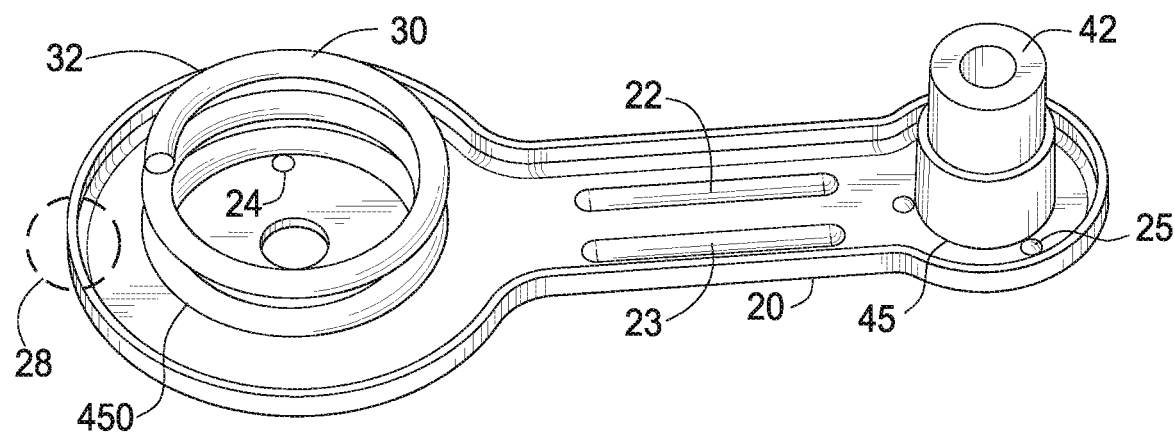
FIG. 4 is a top perspective view of the pivot arm.

FIG. 4 is a top perspective view of the pivot arm. Depending on the system requirements, spring 30 and shaft 42 may be on the same side or on opposite sides of pivot arm 20. Once spring 30 and shaft 42 are located on the pivot arm by the respective dimples, they are clamped and laser welded to pivot arm 20 at weld bead 450 and weld bead respectively. Laser welding provides for an accurate and strong bond at a reduced cost over the prior art. Spring 30 has a relatively high hardness while the sheet metal pivot arm 20 has a relatively low hardness. Even so, laser welding joins them without the adverse effect of large heat affected zones common for conventional stick type welding such as SMAW. Although laser welding is preferred, other embodiments using other welding processes, such as TIG, or mechanical joining may also be used. In alternate embodiments one or the other of shaft 42 or spring 30 is laser welded to pivot arm 20.

A stamping process is used to roll edge 28 of pivot arm 20. Rolled edge 28 imparts additional stiffness to resist bending moments applied to the cantilever pivot arm 20. Edge 28 also imparts a finished edge to the pivot arm which contributes to the aesthetics of the tensioner. Rolled edge 28 may extend about the entire perimeter of pivot arm 20, or it can be limited to selected portions of pivot arm 20 as may be required by a user. Rolled edge 28 may be oriented toward either side of pivot arm 20 depending on the design requirements of a user.

Figure 5:
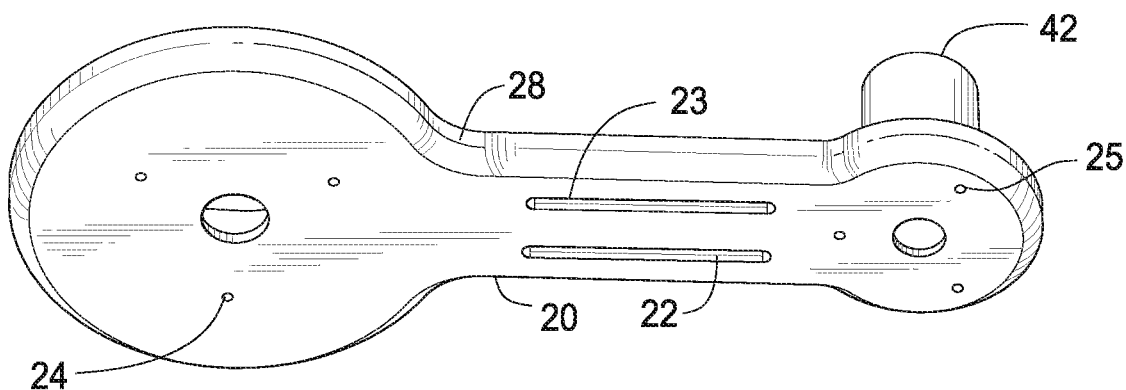
FIG. 5 is a bottom perspective view of the pivot arm.

FIG. 5 is a bottom perspective view of the pivot arm. Ribs 22, 23 are embossed in pivot arm 20. Dimples or protrusions 24, 25 are also embossed. Coining may also be used to apply the ribs and dimples.

Figure 6:
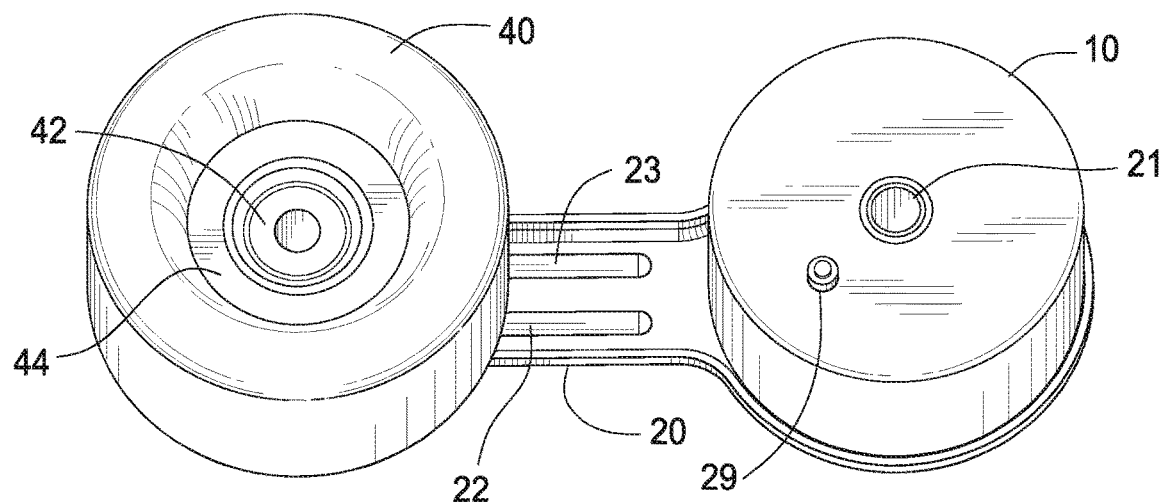
FIG. 6 is a top perspective view of the tensioner.

FIG. 6 is a top perspective view of the tensioner. Base 10 can be stamped or die cast using aluminum or other known materials. For assembly, spring 30 with damping member 50 is assembled into base 10. Spring 30 is welded to pivot arm 20. Bearing 41 is pressed on to shaft 42. Pulley 40 is pressed on to bearing 41. Shaft 42 is welded to pivot arm 20.

Pin 29 protruding from base 10 engages a hole in a mounting surface (not shown). Pin 29 prevents rotation of base 10 during operation, therefore acting as a reaction point for the spring force of spring 30.

Figure 7:
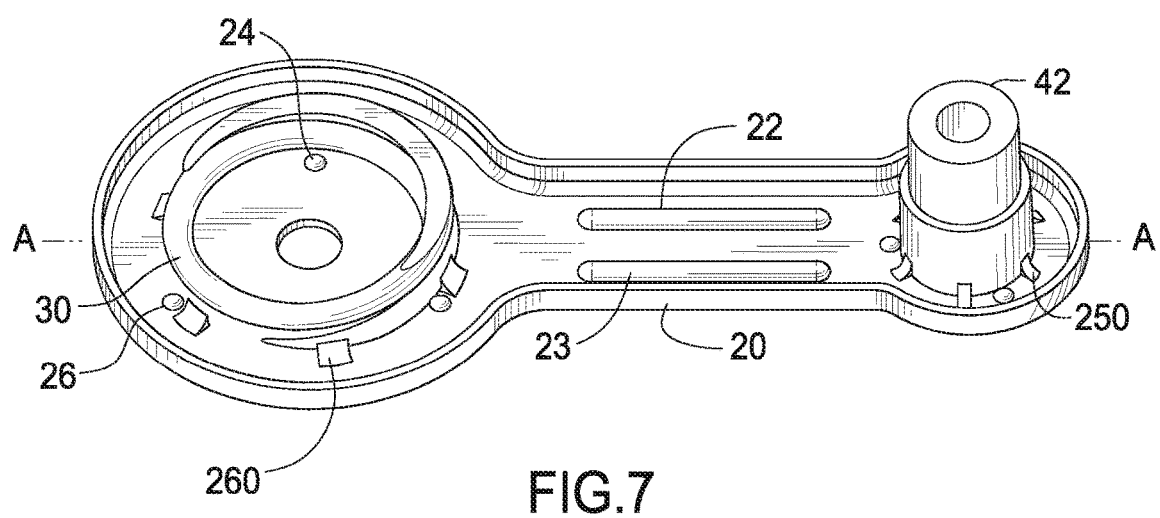
FIG. 7 is a top perspective view of the pivot arm.

FIG. 7 is a top perspective view of the pivot arm. As an alternative to welding, clips 250 and 260 may be used to mechanically attach spring 30 and shaft 42 respectively to pivot arm 20. Clips 250 and 260 also serve to locate spring 30 and shaft 42.

Figure 8:
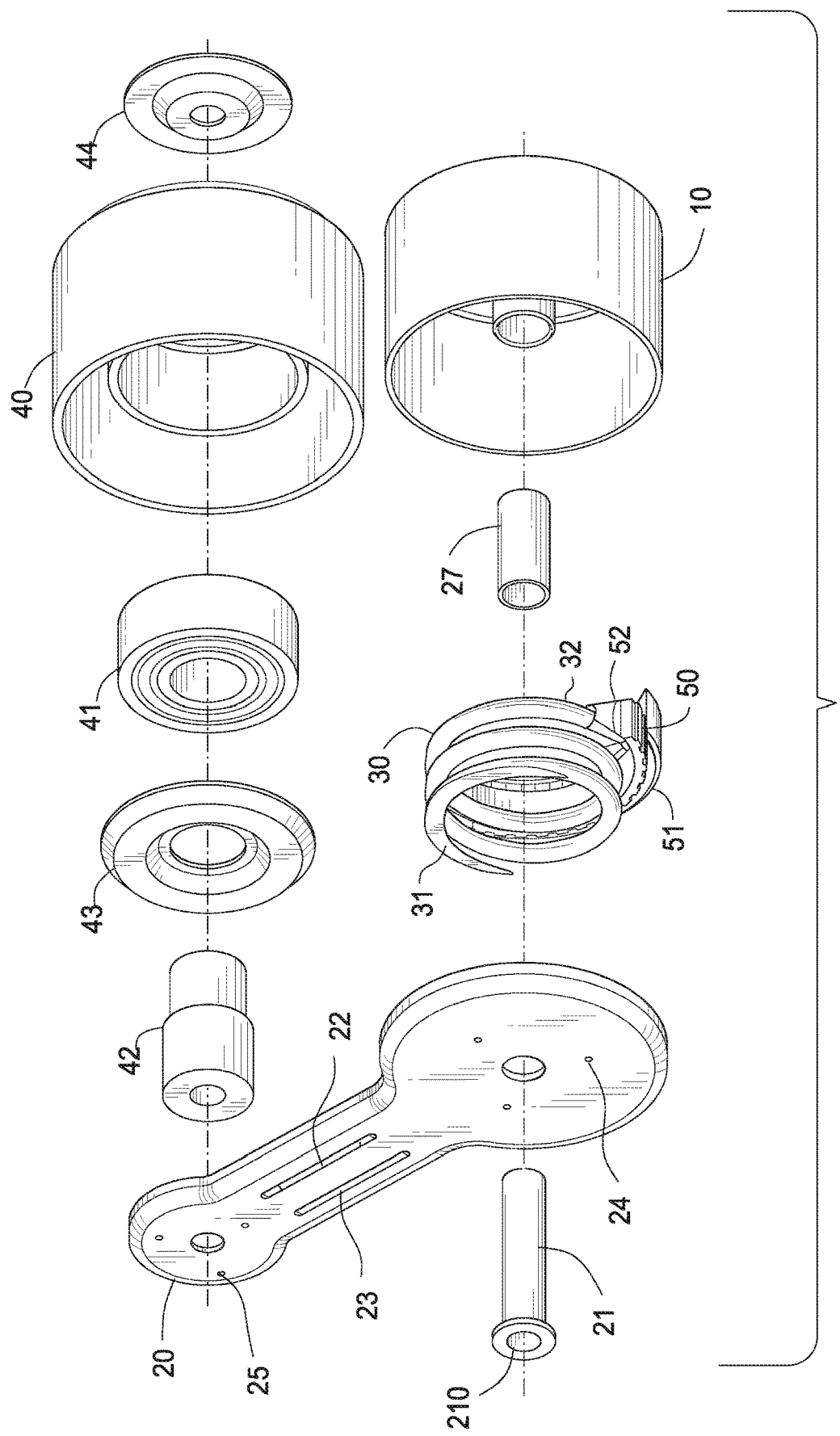
FIG. 8 is an exploded view.

FIG. 8 is an exploded view. Damping member 50 comprises a frictional material 51 that frictionally engages inner surface 11. Damping member 50 further comprises an arcuate shoe 52 which is connected to end 32 of spring 30. Arcuate shoe 52 has a length of approximately 180 degrees about spring 30. Spring surface is ground flat for proper fitment and welding of the spring to pivot arm 20. Shaft 21 is press fit into pivot arm 20. Pulley 40 engages a belt in a belt driven accessory system (not shown).

A fastener such as a bolt (not shown) extends through hole 210 in shaft 21 to mount the tensioner to a mounting surface (not shown).

Figure 9:
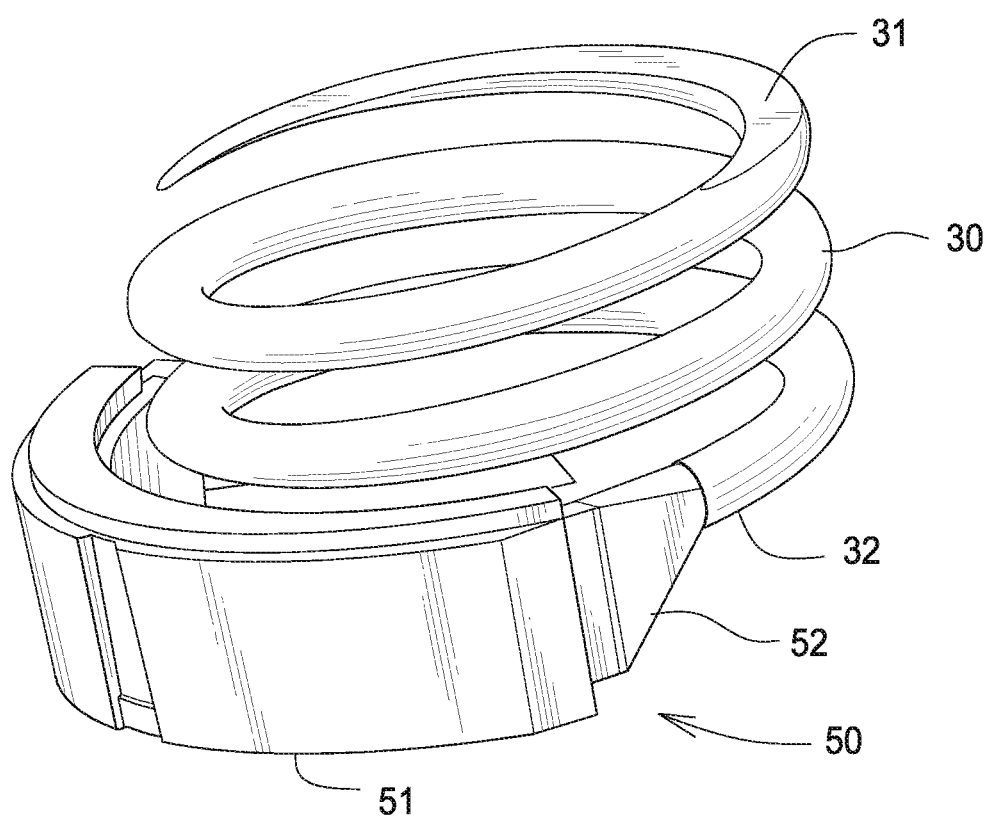
FIG. 9 is a perspective view of the damping member.

FIG. 9 is a perspective view of the damping member. Torsion spring 30 comprises flat surface 31. Surface 31 engages pivot arm 20. Damping member 50 engages end 32. Arcuate shoe 52 connected to end 32 of spring 30. Frictional material 51 is molded to shoe 52.

Although forms of the invention have been described herein, it will be obvious to those skilled in the art that variations may be made in the construction and relation of parts without departing from the spirit and scope of the invention described herein. Unless otherwise specifically noted, components depicted in the drawings are not drawn to scale. Further, it is not intended that any of the appended claims or claim elements invoke 35 U.S.C. § 112(f) unless the words "means for" or "step for" are explicitly used in the particular claim. The present disclosure should in no way be limited to the exemplary embodiments or numerical dimensions illustrated in the drawings and described herein.

We claim:

1. A tensioner comprising:
   a base;
   a pivot arm pivotally mounted to the base;
   a spring disposed between the pivot arm and the base;
   an arcuate damping member engaged on one end of the spring, the arcuate damping member frictionally engaged with the base;
   a pulley journalled to the pivot arm on a shaft;
   the pivot arm comprising stamped metal and a rolled edge and one or more reinforcing ribs; and
   the spring and the shaft being laser welded to the pivot arm.

2. The tensioner as in claim 1, wherein the spring is a torsion spring.

3. The tensioner as in claim 1, wherein the pivot arm further comprises protrusions for locating the spring and the shaft thereupon.

4. The tensioner as in claim 1, wherein the reinforcing ribs extend in a longitudinal direction on the pivot arm aligned on an axis A-A between the pulley and the base.

5. A tensioner comprising:
   a base;
   a pivot arm pivotally mounted to the base;
   a spring disposed between the pivot arm and the base;
   a damping member engaged on one end of the spring, the damping member frictionally engaged with the base;
   a pulley journalled to the pivot arm on a shaft;
   the pivot arm comprising stamped metal, and one or more reinforcing ribs, each reinforcing rib extends in a longitudinal direction on the pivot arm aligned on an axis between the pulley and the base; and
   the spring is laser welded to the pivot arm.

6. The tensioner as in claim 5, wherein the shaft is laser welded to the pivot arm.

* * * * *